US011263840B2

(12) United States Patent
Olsson et al.

(10) Patent No.: US 11,263,840 B2
(45) Date of Patent: Mar. 1, 2022

(54) DELEGATION AND AUXILIARY CONDITION FOR PHYSICAL ACCESS

(71) Applicant: ASSA ABLOY AB, Stockholm (SE)

(72) Inventors: Håkan Olsson, Hägersten (SE); Frans Lundberg, Saltsjöbaden (SE); Kenneth Pernyer, Stockholm (SE); Sona Singh, Täby (SE); Stefan Strömberg, Stockholm (SE)

(73) Assignee: ASSA ABLOY AB, Stockholm (SE)

(*) Notice: Subject to any disclaimer, the term of this patent is extended or adjusted under 35 U.S.C. 154(b) by 0 days.

(21) Appl. No.: 16/487,163

(22) PCT Filed: Feb. 23, 2018

(86) PCT No.: PCT/EP2018/054521
§ 371 (c)(1),
(2) Date: Aug. 20, 2019

(87) PCT Pub. No.: WO2018/154058
PCT Pub. Date: Aug. 30, 2018

(65) Prior Publication Data
US 2020/0058180 A1 Feb. 20, 2020

(30) Foreign Application Priority Data
Feb. 24, 2017 (SE) .................... 1750200-6

(51) Int. Cl.
G07C 9/00 (2020.01)
G07C 9/20 (2020.01)
(Continued)

(52) U.S. Cl.
CPC ..... G07C 9/00174 (2013.01); G07C 9/00309 (2013.01); G07C 9/00571 (2013.01);
(Continued)

(58) Field of Classification Search
CPC ............ G07C 9/00174; G07C 9/00309; G07C 9/00904; G07C 9/20; G07C 9/00571; H04L 9/3247; H04L 43/10
(Continued)

(56) References Cited

U.S. PATENT DOCUMENTS 9,542,785 B2 * 1/2017 Meganck ........... G07C 9/00706
2015/0222517 A1 8/2015 McLaughlin et al.
(Continued)

FOREIGN PATENT DOCUMENTS

WO WO 01/63385 8/2001
WO WO 03/088166 10/2003
WO WO 2014/098755 6/2014

OTHER PUBLICATIONS

Borisov et al. "Active Certificates: A Framework for Delegation," Network and Distributed System Security Symposium 2002, Feb. 2002, 11 pages.
(Continued)

Primary Examiner — Vernal U Brown
(74) Attorney, Agent, or Firm — Sheridan Ross P.C.

(57) ABSTRACT

It is provided a method for controlling access to a physical space. The method is performed in an access control device and comprises the steps of: communicating with an electronic key to obtain an identity of the electronic key; obtaining a plurality of delegations; determining, from one of the delegations, that there is an auxiliary condition, wherein the auxiliary condition is that access is approved for the electronic key by an auxiliary party, authenticated by a digital signature by the auxiliary party; and granting access to the physical space when the plurality of delegations comprises a sequence of delegations covering a delegation path from the access control device to the electronic key such that, in the sequence of delegations, the delegator of the
(Continued)

first delegation is the access control device, the receiver of the last delegation is the electronic key, and the auxiliary condition is fulfilled.

18 Claims, 5 Drawing Sheets

(51) Int. Cl.
　　*H04L 9/32* (2006.01)
　　*H04L 43/10* (2022.01)
　　*H04L 29/06* (2006.01)
(52) U.S. Cl.
　　CPC ........... *G07C 9/00904* (2013.01); *G07C 9/20* (2020.01); *H04L 9/3247* (2013.01); *H04L 43/10* (2013.01); *H04L 63/0823* (2013.01)
(58) Field of Classification Search
　　USPC ......................................................... 340/5.2
　　See application file for complete search history.

(56) References Cited

U.S. PATENT DOCUMENTS

| | | | |
|---|---|---|---|
| 2016/0042207 A1* | 2/2016 | Inotay | ................. H04L 63/0492 340/5.8 |
| 2017/0011570 A1 | 1/2017 | Johnson et al. | |
| 2017/0109759 A1* | 4/2017 | Korb | .................... G06Q 30/018 |

OTHER PUBLICATIONS

Taly et al. "Distributed Authorization in Vanadium," arxiv.org, Cornell University Library, 201 Olin Library Cornell University Ithaca, NY, Jul. 2016, 24 pages.
International Search Report and Written Opinion for International (PCT) Patent Application No. PCT/EP2018/054521, dated May 25, 2018, 12 pages.
International Preliminary Report on Patentability for International (PCT) Patent Application No. PCT/EP2018/054521, dated May 14, 2019, 13 pages.
Official Action for Sweden Patent Application No. 1750200-6, dated Nov. 6, 2017, 7 pages.

\* cited by examiner

US 11,263,840 B2

DELEGATION AND AUXILIARY CONDITION FOR PHYSICAL ACCESS

CROSS REFERENCE TO RELATED APPLICATIONS

This application is a national stage application under 35 U.S.C. 371 and claims the benefit of PCT Application No. PCT/EP2018/054521 having an international filing date of 23 Feb. 2018, which designated the United States, which PCT application claimed the benefit of Sweden Patent Application No. 1750200-6 filed 24 Feb. 2017, the disclosure of each of which are incorporated herein by reference.

TECHNICAL FIELD

The invention relates to a method, an access control device, a computer program and a computer program product relating to controlling access to a physical space using an auxiliary condition.

BACKGROUND

Locks and keys are evolving from the traditional pure mechanical locks. These days, there are wireless interfaces for access control devices controlling to access using electronic locks, e.g. by interacting with an electronic key. Such wireless interfaces improve usability while electronic key management is significantly more flexible regarding management of access rights compared to pure mechanical locks, especially when a local access control device communicates with an access control server to verify access rights for a particular electronic key. In that way, access for a particular electronic key can be managed centrally by managing the access rights stored in the access control server.

However, there are a number of problems with this approach of central access right management. One problem is scalability, since the server and communication paths need to be scaled when new locks and access control devices are deployed. Moreover, the system is vulnerable in the sense that the server needs to be available for verifying access.

There are also offline systems available, where access rights are stored in the lock or in the key. However, the offline systems are either very simple and non-flexible, or managed by intermittent access to a server, which gives the same problems as for an online system, albeit to a less degree.

SUMMARY

It is an object of embodiments presented herein to provide an improved way to control access to a physical space.

According to a first aspect, it is provided a method for controlling access to a physical space. The method is performed in an access control device and comprises the steps of: communicating with an electronic key to obtain an identity of the electronic key; obtaining a plurality of delegations, wherein each delegation is a delegation from a delegator to a receiver; determining, from one of the delegations in the plurality of delegations, that there is an auxiliary condition, wherein the auxiliary condition is that access is approved for the electronic key by an auxiliary party, authenticated by a digital signature by the auxiliary party; and granting access to the physical space when the plurality of delegations comprises a sequence of delegations covering a delegation path from the access control device to the electronic key such that, in the sequence of delegations, the delegator of the first delegation is the access control device, the receiver of the last delegation is the electronic key, and the auxiliary condition is fulfilled.

The auxiliary party is an employer of a person associated with the electronic key, in which case, one receiver in the sequence of delegations is an access right coordinator.

The auxiliary party may be an access right coordinator and wherein one receiver in the sequence of delegations is an employer of a person associated with the electronic key.

The step of obtaining a plurality of delegations may comprise obtaining at least one delegation from storage of the access control device.

The first delegation may be obtained from storage of the access control device.

The step of obtaining a plurality of delegations may comprise obtaining at least one delegation from the electronic key.

Each delegation obtained from the electronic key may be digitally signed by the delegator of the respective delegation.

The method may further comprise the step of: evaluating any time constraints of all of the plurality of delegations, in which case the step of granting access is only performed when none of the time constraints are violated.

In one embodiment, the auxiliary part is not a delegator in the sequence of delegations.

According to a second aspect, it is provided an access control device for controlling access to a physical space. The access control device comprises: a processor; and a memory storing instructions that, when executed by the processor, causes the access control device to: communicate with an electronic key to obtain an identity of the electronic key; obtain a plurality of delegations, wherein each delegation is a delegation from a delegator to a receiver; determine, from one of the delegations in the plurality of delegations, that there is an auxiliary condition, wherein the auxiliary condition is that access is approved for the electronic key by an auxiliary party, indicated by a digital signature by the auxiliary party; and grant access to the physical space when the plurality of delegations comprises a sequence of delegations covering a delegation path from the access control device to the electronic key such that, in the sequence of delegations, the delegator of the first delegation is the access control device, the receiver of the last delegation is the electronic key, and the auxiliary condition is fulfilled.

The auxiliary party may be an employer of a person associated with the electronic key, in which case one receiver in the sequence of delegations is an access right coordinator.

The auxiliary party may be an access right coordinator, in which case one receiver in the sequence of delegations is an employer of a person associated with the electronic key.

The instructions to obtain a plurality of delegations may comprise instructions that, when executed by the processor, causes the access control device to obtain at least one delegation from storage of the access control device.

The first delegation may be obtained from storage of the access control device.

The instructions to obtain a plurality of delegations may comprise instructions that, when executed by the processor, causes the access control device to obtain at least one delegation from the electronic key.

Each delegation obtained from the electronic key may be digitally signed by the delegator of the respective delegation.

The access control device may further comprise instructions that, when executed by the processor, causes the access control device to: evaluate any time constraints of all of the plurality of delegations; and only perform the instructions to grant access when none of the time constraints are violated.

According to a third aspect, it is provided a computer program for controlling access to a physical space. The computer program comprises computer program code which, when run on a access control device causes the access control device to: communicate with an electronic key to obtain an identity of the electronic key; obtain a plurality of delegations, wherein each delegation is a delegation from a delegator to a receiver; determine, from one of the delegations in the plurality of delegations, that there is an auxiliary condition, wherein the auxiliary condition is that access is approved for the electronic key by an auxiliary party, indicated by a digital signature by the auxiliary party; and grant access to the physical space when the plurality of delegations comprises a sequence of delegations covering a delegation path from the access control device to the electronic key such that, in the sequence of delegations, the delegator of the first delegation is the access control device, the receiver of the last delegation is the electronic key, and the auxiliary condition is fulfilled.

According to a fourth aspect, it is provided a computer program product comprising a computer program according to the third and a computer readable means on which the computer program is stored.

By enforcing both a sequence of delegations and the auxiliary condition in the access control device, any party (delegator), such as an access right coordinator, in the sequence of delegations can control when access should be allowed. However, since also the auxiliary condition needs to be fulfilled, the access right coordinator only provides a necessary but not sufficient condition for the access control device granting access. In other words, the access right coordinator does not hold any master keys nor is the access right coordinator even free to provide a key to itself for access via the access control device. This improves security greatly since there is no single point in the system where an attacker could gain access.

According to a fifth aspect, it is provided a method for controlling access. The method is performed in an access control device and comprises the steps of: performing an electronic authentication of a user device; obtaining a plurality of delegations, wherein each delegation is a delegation from a delegator to a receiver; determining, from one of the delegations in the plurality of delegations, that there is an auxiliary condition, wherein the auxiliary condition is that access is approved for the user device by an auxiliary party, authenticated by a digital signature by the auxiliary party; and granting access to the physical space when the plurality of delegations comprises a sequence of delegations covering a delegation path from the access control device to the user device such that, in the sequence of delegations, the delegator of the first delegation is the access control device, the receiver of the last delegation is the user device, and auxiliary condition is fulfilled.

In the fifth aspect, the access is not limited to a physical space but could be e.g. an access to configure an access control device, reset an access control device, send an identity, etc.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 5 is a schematic diagram illustrating some components of an access control device according to FIG. 1.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
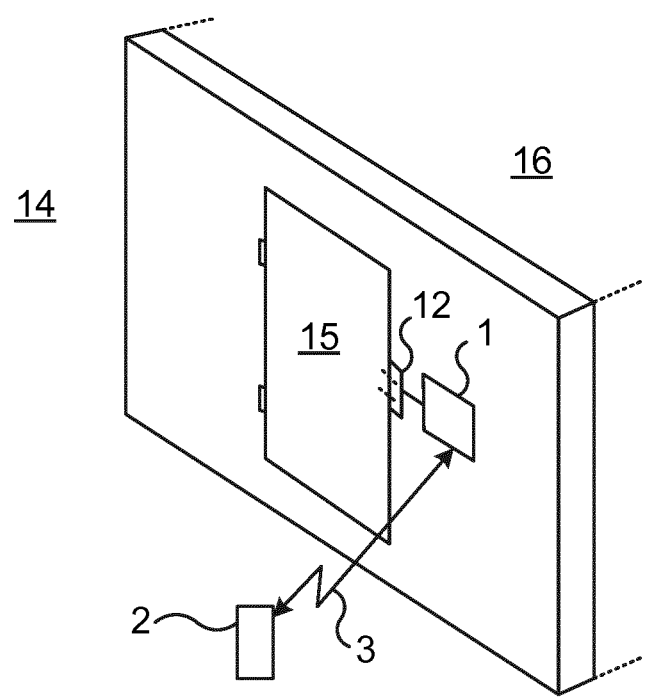
FIG. 1 is a schematic diagram showing an environment in which embodiments presented herein can be applied.

FIG. 1 are schematic diagrams showing an environment in which embodiments presented herein can be applied. Access to a physical space 16 is restricted by a physical barrier 15, which is selectively unlockable. The physical barrier 15 stands between the restricted physical space 16 and an accessible physical space 14. Note that the accessible physical space 14 can be a restricted physical space in itself, but in relation to this particular physical barrier 15, the accessible physical space 14 is accessible. The barrier 15 can be a door, gate, hatch, window, drawer, lockable packaging, etc. In order to unlock the barrier 15, an access control device 1 is provided. The access control device 1 is connected to (or combined with) a physical lock 12, which is controllable by the access control device 1 to be set in an unlocked state or locked state. The access control device 1 is mounted close to the physical lock 12. The barrier 15 is provided in a surrounding fixed structure, such as a wall or fence.

The access control device 1 is able to receive and send signals from/to an electronic key 2 over a communication channel 3 which may be a short-range wireless interface or a conductive (i.e. galvanic/electric) connection. The electronic key 2 is any suitable device which is portable by a user and which can be used for authentication over the communication channel 3. The portable key is associated with the user. The electronic key 2 is typically carried or worn by a user and may be implemented as a physical key, a key fob, wearable device, smart phone, etc. The short-range wireless interface is a radio frequency wireless interface and could e.g. employ Bluetooth, Bluetooth Low Energy (BLE), Zig- Bee, Radio Frequency Identification (RFID), any of the IEEE 802.11 standards, any of the IEEE 802.15 standards, wireless Universal Serial Bus (USB), etc. The electronic key can also be considered to be a credential. Using the communication channel 3, the identity of the electronic key 2 can be obtained. Moreover, the authenticity of the identity of the electronic key 2 can be checked, e.g. using a challenge and response scheme or by verifying a digital signature. In any case, an identity of the electronic key 2 is obtained, which is used in the process to grant or deny access as explained in more detail below.

When access is granted, the access control device 1 sends an unlock signal to the lock 12, whereby the lock 12 is set in an unlocked state. In this embodiment, this can e.g. imply a signal over a wire-based communication interface, e.g. using Universal Serial Bus (USB), Ethernet, a serial connection (e.g. RS-485 or RS-232) or even a simple electric connection, or alternatively signal over a wireless communication interface. When the lock 12 is in an unlocked state, the barrier 15 can be opened and when the lock 12 is in a locked state, the barrier 15 cannot be opened. In this way, access to a closed space 16 is controlled by the access control device 1. It is to be noted that the access control device 1 and/or the lock 12 can be mounted in the fixed structure by the physical barrier 15 (as shown) or in the physical barrier 15 itself (not shown). Optionally, the lock 12 and access control device 1 are combined in one unit.

Optionally, energy harvesting of mechanical user actions and/or environmental power (solar power, wind, etc.) can be utilised to prolong the life span of the battery or even to allow a battery to be omitted for the access control device 1 and/or the lock 12.

Figure 2A:
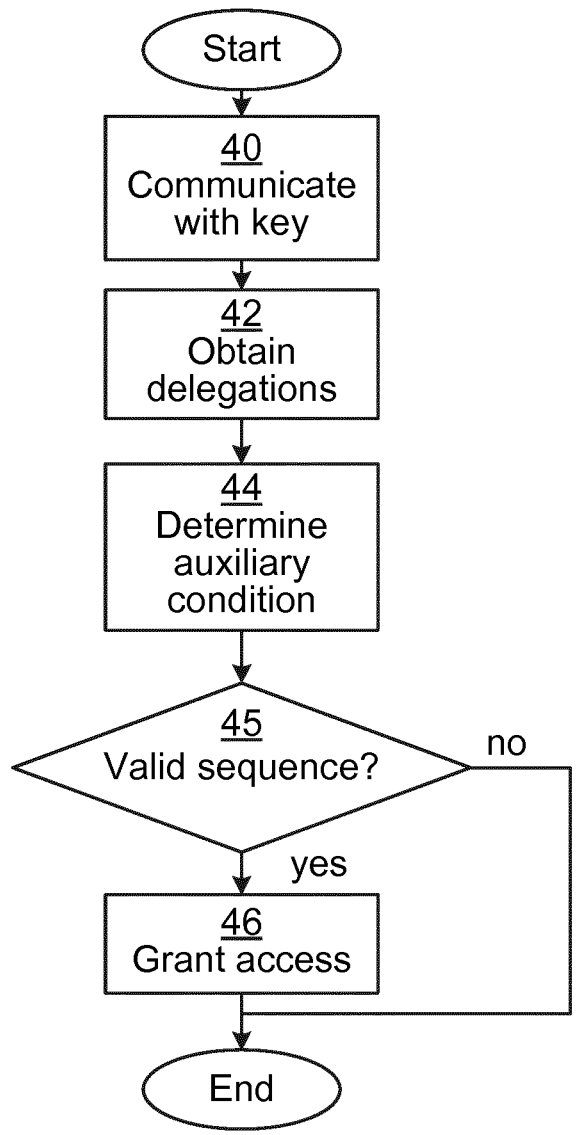
FIGS. 2A-B are flow charts illustrating methods for controlling access to a physical space, performed in the access control device of FIG. 1.
Figure 2B:
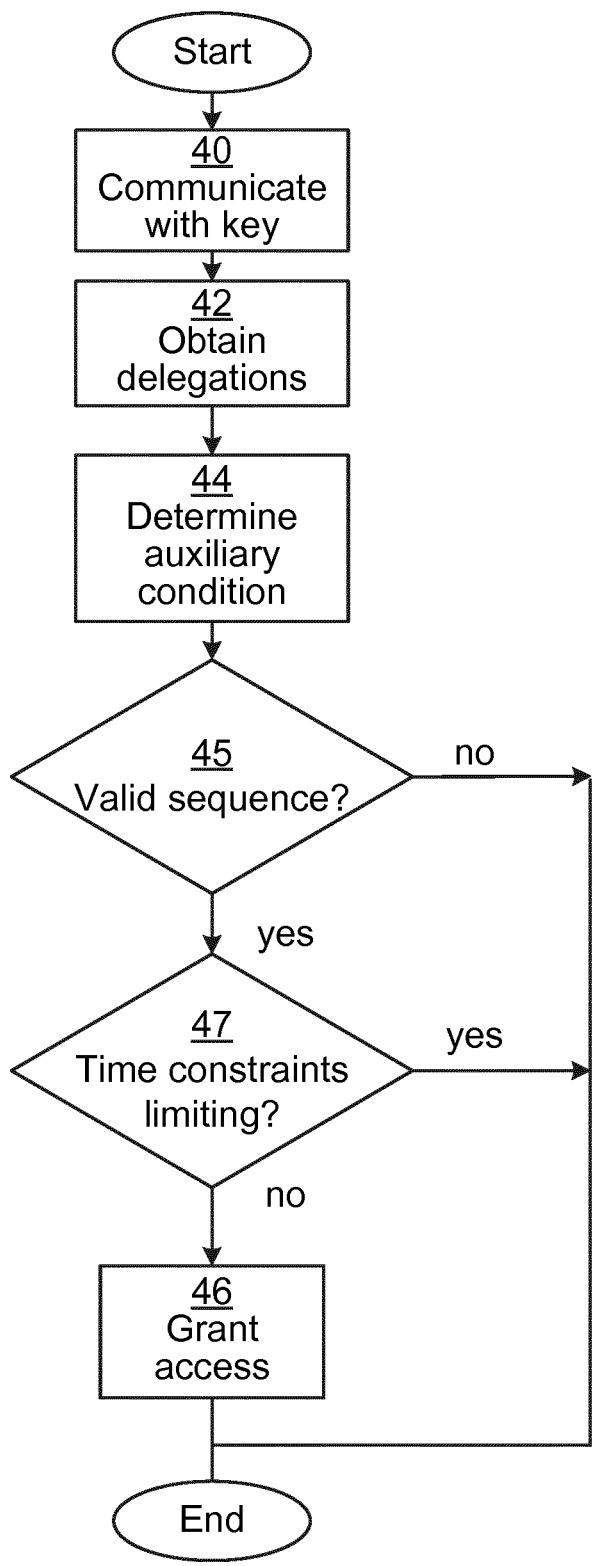

FIGS. 2A-B are flow charts illustrating methods for controlling access to a physical space, performed in the access control device of FIG. 1. First, the embodiments illustrated by FIG. 2A will be described.

In a communicate with key step 40, the access control device communicates with an electronic key to obtain an identity of the electronic key. The identity can be authenticated, e.g. as explained above.

In an obtain delegations step 42, a plurality of delegations is obtained. Each delegation is a data item indicating a delegation from a delegator to a receiver. Optionally, this step comprises obtaining at least one delegation from a (local and persistent) storage of the access control device. For instance, the first delegation, being a delegation from the access control device, can be obtained from storage of the access control device. Optionally, this step comprises obtaining at least one delegation from the electronic key. In such a case, each delegation obtained from the electronic key can be mandated to be digitally signed by the delegator of the respective delegation, i.e. delegations obtained from the electronic key which are not validly signed are discarded. It is to be noted that the first delegation can be implemented by assigning one or more owners in the configuration of the access control device. In other words, optionally, the first delegation can be implemented differently from the subsequent delegations in the sequence.

In a determine auxiliary condition step 44, the access control device determines, from one of the delegations in the plurality of delegations, that there is an auxiliary condition. The auxiliary condition is that access needs to be approved for the electronic key by an auxiliary party. This approval is authenticated by a digital signature by the auxiliary party. In one embodiment, the auxiliary condition is derived from the first delegation, e.g. a delegation from the access control device. This corresponds to the owner of the access control device defining the auxiliary condition.

The authentication by the auxiliary part can be implemented using a delegation sequence (of one or more delegations), comprising a delegation from the auxiliary party, to the electronic key.

In one embodiment, the auxiliary party is an employer of a person associated with the electronic key. In such a situation, one receiver in the sequence of delegations is an access right coordinator.

In one embodiments, the auxiliary party is an access right coordinator. In such a case, one receiver in the sequence of delegations is an employer of a person associated with the electronic key.

In a conditional valid sequence step 45, it is determined whether the plurality of delegations comprise a sequence of delegations covering a delegation path from the access control device to the electronic key such that, in the sequence of delegations, the delegator of the first delegation is the access control device, the receiver of the last delegation is the electronic key, and the auxiliary condition is fulfilled. In the sequence of delegations, for each delegation except the first delegation, each delegator is the receiver of the preceding delegation. If this determination is affirmative, the method proceeds to a grant access step 46. Otherwise, the method ends.

In the grant access step 46, access to the physical space is granted. This results in an unlock signal being sent to the lock as explained above.

It is to be noted that a delegation can optionally be provided with a limitation to further delegations by the receiver of the delegation. For instance, a delegation can be provided with no right to further delegations by the receiver, with unlimited rights to further delegations, or with a right to delegate a certain number of further steps away from the delegator. This can be enforced in the access control device by verifying that no such limitation in further delegations is violated prior to granting access.

Looking now to FIG. 2B, only new or modified steps compared to the method illustrated by FIG. 2A are described.

In an optional conditional time constraints limiting step 47, any time constraints of all of the plurality of delegations are evaluated. It is to be noted that, depending on the circumstances, only a subset (or none) of the delegations could contain time constraints. When none of the time constraints are violated, the method proceeds to the grant access step 46. Otherwise, the method ends.

It is to be noted that the order of steps 45 and 47 is not important and can be shifted as desired.

Some examples will now be presented to illustrate what is made possible with the solutions presented herein. In the examples here, while delegations are mentioned to be delegations to users, to make the description clearer, the delegations are implemented as delegations to electronic keys of the users. In other words, when a delegation to a user is mentioned, it is in fact a delegation to an electronic key associated with that user.

Figure 3:
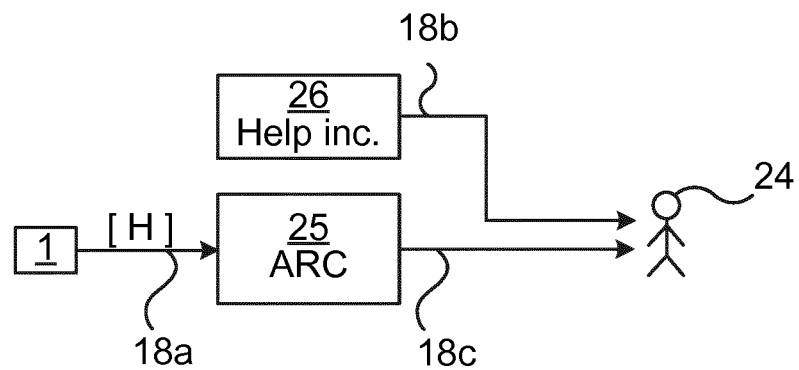
FIG. 3 illustrates a scenario applicable by embodiments presented herein where a user delegates access to an Access Right Coordinator for access by a home care company.

FIG. 3 illustrates a scenario applicable by embodiments presented herein where a user delegates access to an Access Right Coordinator for access by a home care company.

Here, there is a situation where Tim, owning the access control device 1, should provide access for Bill 24, who works for a home care company Help Inc. However, Tim would like to provide access for anyone being approved Help Inc., since Tim does not know who will provide the service on each particular occasion. An Access Right Coordinator (ARC) coordinates the key management for many different users and potentially many different employers.

Tim thus configures a first delegation 18a from the access control device 1 to the ARC 25. However, the first delegation contains an auxiliary condition.

The auxiliary condition states that access needs to be approved for the electronic key by an auxiliary party, in this case Help Inc. (indicated by 'H' on the label of the first delegation 18a). In this way, the ARC could not use the delegation directly (or to one of its employees) to thereby gain access to the physical space, since the employees of ARC are not approved by Help Inc.

However, Help Inc. 26 provides a second delegation to Bill 24. The second delegation 18b is digitally signed by Help Inc. 26. The second delegation 18b can be provided for storage by the ARC 25 or in a host device (e.g. smartphone) of the electronic key of Bill 24. Since the second delegation 18b is digitally signed by Help Inc. 26, this second delegation 18b cannot be manipulated by the ARC 25.

For Bill 24 to gain access, the ARC 25 provides a third delegation 18c from the ARC to Bill 24 (or more accurately the electronic key of Bill 24). The electronic key of Bill 24 can e.g. be stored in an app on a smartphone. This app can also store the second delegation 18b.

When Bill 24 approaches the access control device 1, there is now a sequence of delegations from the access control device 1 to Bill 24, consisting of the first delegation 18a and the third delegation 18c. Moreover, the auxiliary condition is satisfied by the second delegation 18b. Hence, Bill 24 will be granted access by the access control device 1.

In this way, the first delegation 18a by Tim can be securely stored by the ARC 25 while Help Inc. 26 is in control of who they approve, i.e. whom they employ or hire.

Still, the day to day management of keys can be maintained by the ARC 25, who can issue the third delegation 18c when deemed necessary, e.g. according to a schedule. The third delegation 18c can have a limited validity time (e.g. 24 hours or 8 hours), to ensure that the ARC 25 is in control of access in accordance with the schedule. Meanwhile, the second delegation 18b can have a long validity time (months, years, . . . ) since the fine grained access can be controlled by the third delegation 18c. In this way, Help Inc. 26 is relieved from the task of fine-grained access control. Moreover, it is easier to store securely a key pair for signing when it is rarely used and its use is manually initiated. Help Inc. can store their key pair locked up in a safe and only use the key pair e.g. once a year for existing employees and when a new employee starts.

In the prior art, the ARC 25 holds master keys to be able to issue access to the access control device 1, e.g. according to a schedule. In contrast, using the embodiments presented herein, the ARC 25 does not have a master key for any control devices 1. In fact, the ARC 25 cannot by itself issue access, but only in conjunction with a delegation by the auxiliary party, in this case Help Inc. 26. In other words, while the ARC 25 can control daily schedules and access rights as needed, this is only applicable for entities which are also delegated an access right by the auxiliary party 26.

If Tim switches home care company from Help Inc. to Care Inc., he replaces the first delegation 18a with a delegation to ARC 25 with a new auxiliary condition that access needs to be approved for the electronic key by a new auxiliary party, now being Care Inc. In this way, access is barred from any employees of Help Inc. while access is now instead provided for employees of Care Inc.

The access control device only allows access when delegations from two separate paths are provided to the access control device. It can thus be seen how the ARC 25 could securely store a great number of first delegations 18a and a great number of second delegations IA, and thus issue third delegations 18c when needed, with the important limitation of access only being granted for those individuals who are approved by the auxiliary party indicated on the first delegation 18a.

Figure 4:
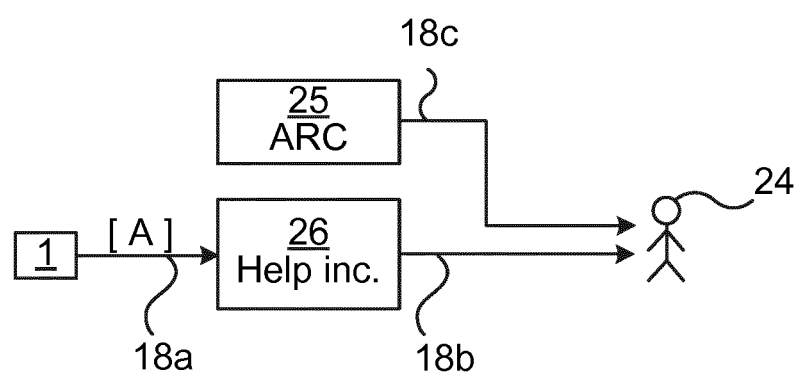
FIG. 4 and FIG. 5 are schematic illustrations illustrating examples of delegations that can be used in the access control device of FIG. 1.

FIG. 4 illustrates a scenario applicable by embodiments presented herein where a user delegates access to a home care company.

In this scenario, Tim sets a first delegation 18a from the access control device 1 to Help Inc. 26, with an auxiliary condition. The auxiliary condition states that access needs to be approved for the electronic key by an auxiliary party, in this case ARC 25 (indicated by 'A' on the label of the first delegation 18a).

Help Inc. 26 issues a second delegation 18b to Bill 24 (or more accurately, the electronic key associated with Bill). In parallel, the ARC 26 issues a third delegation 18c to Bill 24.

Once Bill 24 is by the access control device, there is a sequence of delegations and the auxiliary condition is fulfilled, whereby Bill is granted access.

Using this embodiment, the ARC 25 can remove access for Bill 24 if necessary.

Another possible scenario is that the second delegation is a delegation from Help Inc. 26 to the ARC 25. This would still satisfy the auxiliary condition of the first delegation 18a.

It is to be noted that, in the scenarios of FIGS. 3 and 4, additional auxiliary conditions can be added in the first delegation 18a. For instance, the first delegation can contain an additional auxiliary condition that the user (Bill) should be a certified nurse, which can be represented by a further delegation from a nursing certification authority to Bill.

In one embodiment, it may be sufficient that only a subset of the conditions (delegations) are satisfied, e.g. two of three conditions (delegations).

By using the delegation sequence as described here, great flexibility and control is provided without the need for a central access server, since all delegations can occur without any online access by the access control device. Delegations can be made in any suitable way directly or indirectly, supporting new business cases not possible using prior art systems. By supporting many use cases and scenarios, a single type of lock can be used, i.e. there no need for multiple versions of the lock for different uses, greatly reducing costs in development, production and distribution.

Also, by not requiring a central server, massive scalability is provided. Security is also improved since there is no single point, which can be attacked by an attacker, controlling access for all locks. Through the use of the sequence comprising signed delegations, non-repudiation is achieved. The non-repudiation is achieved for the delegations that are digitally signed. Optionally, all delegations are digitally signed to achieve a complete sequence of non-repudiable delegations. The non-repudiations may e.g. allow a lock owner to prove (in a court of law) that access was delegated by a package delivery company to a particular person when that person performs a criminal action (e.g. theft) in the house of the lock owner. The package delivery company cannot deny the delegation. In many jurisdictions, digital signatures have the same status as paper signatures.

Figure 5:
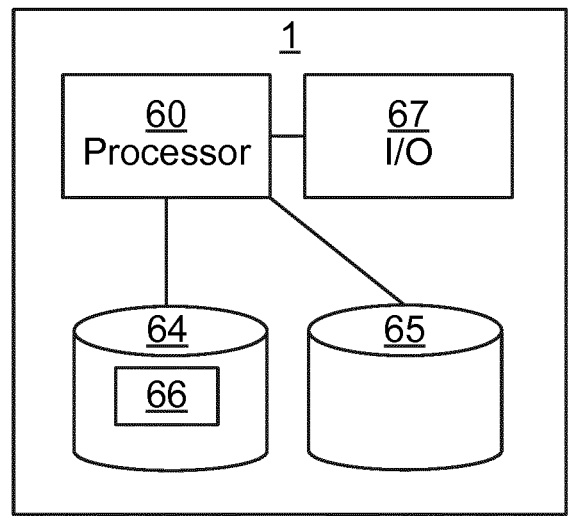

FIG. 5 is a schematic diagram showing some components of the access control device 1 of FIG. 1. A processor 60 is provided using any combination of one or more of a suitable central processing unit (CPU), multiprocessor, microcontroller, digital signal processor (DSP), application specific integrated circuit etc., capable of executing software instructions 66 stored in a memory 64, which can thus be a computer program product. The processor 60 can be configured to execute the method described with reference to FIGS. 2A-B above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 65 is also provided for reading and/or storing data during execution of software instructions in the processor 60. The data memory 65 can be any combination of read and write memory (RAM) and read only memory (ROM) which may be persistent and/or volatile memory. The data memory 65 can form part of the access control device 1 or be external, but local to, the access control device 1. The data memory 65 can store delegations as described above. The delegations can be stored in a persistent part of the data memory 65, e.g. in a flash memory.

The access control device 1 further comprises an I/O interface 67 for communicating with other external entities such as the lock 12 and the electronic key 2. The I/O interface 67 may also comprise a reader for reading key cards with a magnetic strip or a smart card. The I/O interface 67 may support wire-based communication, e.g. using Universal Serial Bus (USB), Ethernet, or even a simple electric connection (e.g. to the lock 12) or a galvanic/electric connection for communicating with the electronic key 2. Alternatively or additionally, the I/O interface 67 supports wireless communication, e.g. using Bluetooth, BLE, ZigBee, RFID, any of the IEEE 802.11 standards, any of the IEEE 802.15 standards, wireless USB, etc., e.g. for communication with the electronic key 2.

Other components of the access control device 1 are omitted in order not to obscure the concepts presented herein.

Optionally, the lock 12 of FIG. 1 forms part of the access control device 1.

Figure 6:
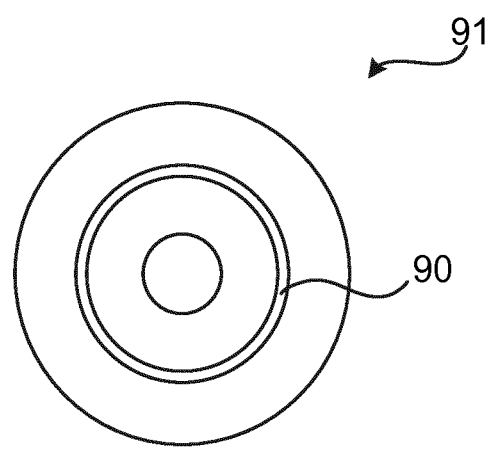
FIG. 6 shows one example of a computer program product comprising computer readable means.

FIG. 6 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 5. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method for controlling access to a physical space, the method being performed in an access control device and comprising:

communicating with an electronic key to obtain an identity of the electronic key;

obtaining a plurality of delegations, wherein each delegation is a data item indicating a delegation from a delegator to a receiver;

determining, from one of the delegations in the plurality of delegations, that there is an auxiliary condition, wherein the auxiliary condition is that access is approved for the electronic key by an auxiliary party, authenticated by a digital signature by the auxiliary party; and granting access to the physical space when the plurality of delegations comprises a sequence of delegations covering a delegation path from the access control device to the electronic key such that, in the sequence of delegations, the delegator of the first delegation is the access control device, the receiver of the last delegation is the electronic key, and the auxiliary condition is fulfilled.

2. The method according to claim 1, wherein the auxiliary party is an employer of a person associated with the electronic key, and wherein one receiver in the sequence of delegations is an access right coordinator.

3. The method according to claim 1, wherein the auxiliary party is an access right coordinator and wherein one receiver in the sequence of delegations is an employer of a person associated with the electronic key.

4. The method according to claim 1, wherein obtaining a plurality of delegations comprises obtaining at least one delegation from storage of the access control device.

5. The method according to claim 4, wherein the first delegation is obtained from storage of the access control device.

6. The method according to claim 1, wherein obtaining a plurality of delegations comprises obtaining at least one delegation from the electronic key.

7. The method according to claim 6, wherein each delegation obtained from the electronic key is digitally signed by the delegator of the respective delegation.

8. The method according to claim 1, further comprising:
evaluating any time constraints of all of the plurality of delegations; and
wherein granting access is only performed when none of the time constraints are violated.

9. The method according to claim 1, wherein the auxiliary party is not a delegator in the sequence of delegations.

10. An access control device for controlling access to a physical space, the access control device comprising:
a processor; and
a memory storing instructions that, when executed by the processor, causes the access control device to:
communicate with an electronic key to obtain an identity of the electronic key;
obtain a plurality of delegations, wherein each delegation is a data item indicating a delegation from a delegator to a receiver;
determine, from one of the delegations in the plurality of delegations, that there is an auxiliary condition, wherein the auxiliary condition is that access is approved for the electronic key by an auxiliary party, indicated by a digital signature by the auxiliary party; and
grant access to the physical space when the plurality of delegations comprises a sequence of delegations covering a delegation path from the access control device to the electronic key such that, in the sequence of delegations, the delegator of the first delegation is the access control device, the receiver of the last delegation is the electronic key, and the auxiliary condition is fulfilled.

11. The access control device according to claim 10, wherein the auxiliary party is an employer of a person associated with the electronic key, and wherein one receiver in the sequence of delegations is an access right coordinator.

12. The access control device according to claim 10, wherein the auxiliary party is an access right coordinator and wherein one receiver in the sequence of delegations is an employer of a person associated with the electronic key.

13. The access control device according to claim 10, wherein the instructions to obtain a plurality of delegations comprise instructions that, when executed by the processor, causes the access control device to obtain at least one delegation from storage of the access control device.

14. The access control device according to claim 13, wherein the first delegation is obtained from storage of the access control device.

15. The access control device according to claim 10, wherein the instructions to obtain a plurality of delegations comprise instructions that, when executed by the processor, causes the access control device to obtain at least one delegation from the electronic key.

16. The access control device according to claim 15, wherein each delegation obtained from the electronic key is digitally signed by the delegator of the respective delegation.

17. The access control device according to claim 10, further comprising instructions that, when executed by the processor, causes the access control device to:

evaluate any time constraints of all of the plurality of delegations; and only perform the instructions to grant access when none of the time constraints are violated.

18. A non-transitory computer-readable medium comprising a computer program stored thereon for controlling access to a physical space, the computer program comprising computer program code which, when run on a access control device causes the access control device to:

communicate with an electronic key to obtain an identity of the electronic key;

obtain a plurality of delegations, wherein each delegation is a data item indicating a delegation from a delegator to a receiver;

determine, from one of the delegations in the plurality of delegations, that there is an auxiliary condition, wherein the auxiliary condition is that access is approved for the electronic key by an auxiliary party, indicated by a digital signature by the auxiliary party; and grant access to the physical space when the plurality of delegations comprises a sequence of delegations coveting a delegation path from the access control device to the electronic key such that, in the sequence of delegations, the delegator of the first delegation is the access control device, the receiver of the last delegation is the electronic key, and the auxiliary condition is fulfilled.

* * * * *